United States Patent
Bregman et al.

(10) Patent No.: US 11,475,413 B2
(45) Date of Patent: Oct. 18, 2022

(54) CONCURRENT MEETING AND COMPUTE INSTANCE SCHEDULING

(71) Applicant: Red Hat, Inc., Raleigh, NC (US)

(72) Inventors: Arie Bregman, Raanana (IL); Eran Kuris, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 163 days.

(21) Appl. No.: 16/394,512

(22) Filed: Apr. 25, 2019

(65) Prior Publication Data

US 2020/0342416 A1    Oct. 29, 2020

(51) Int. Cl.
*G06Q 10/10* (2012.01)
*G06F 21/31* (2013.01)
*G06F 9/54* (2006.01)

(52) U.S. Cl.
CPC ......... *G06Q 10/1095* (2013.01); *G06F 9/542* (2013.01); *G06F 21/31* (2013.01)

(58) Field of Classification Search
None
See application file for complete search history.

(56) References Cited

U.S. PATENT DOCUMENTS

| | | | |
|---|---|---|---|
| 6,629,129 B1* | 9/2003 | Bookspan | G06Q 10/10 709/204 |
| 7,328,406 B2* | 2/2008 | Kalinoski | G06F 9/505 715/738 |
| 8,065,175 B1 | 11/2011 | Lewis | |
| 8,181,181 B2 | 5/2012 | Ioannou | |
| 8,881,244 B2* | 11/2014 | Bhogal | G06F 21/6218 726/4 |
| 9,509,632 B2* | 11/2016 | Shen | H04L 47/823 |
| 9,883,003 B2* | 1/2018 | Stott | H04L 67/2852 |
| 10,182,084 B2 | 1/2019 | George | |
| 2004/0111307 A1* | 6/2004 | Demsky | G06Q 10/109 705/7.24 |
| 2008/0271020 A1* | 10/2008 | Leitz | G06F 21/31 718/1 |
| 2009/0106836 A1* | 4/2009 | Toshima | H04L 63/1425 726/22 |
| 2009/0249340 A1* | 10/2009 | Akiyama | G06Q 10/06313 718/100 |
| 2010/0250568 A1* | 9/2010 | Giusti | G06F 8/60 707/758 |
| 2012/0151272 A1* | 6/2012 | Behrendt | G06F 11/203 714/39 |
| 2014/0020086 A1* | 1/2014 | Tanikawa | G06F 21/6245 726/17 |

(Continued)

OTHER PUBLICATIONS

Computer Hope Dictionary, "Bare Metal" (Oct. 7, 2019) available from https://www.computerhope.com/jargon/b/bare-metal.htm (Year: 2019).*

(Continued)

*Primary Examiner* — Folashade Anderson
(74) *Attorney, Agent, or Firm* — Dority & Manning, P.A.

(57) ABSTRACT

Concurrent meeting and compute instance scheduling is disclosed. A request to schedule a compute instance to be provisioned for use during a meeting identified in a meeting invite interface is received. The compute instance is caused to be provisioned at a predetermined time prior to a meeting start time. An address of the compute instance is obtained prior to the meeting start time.

19 Claims, 7 Drawing Sheets

(56) References Cited

U.S. PATENT DOCUMENTS

| | | | | |
|---|---|---|---|---|
| 2014/0122670 | A1* | 5/2014 | Levy | H04L 41/0893 |
| | | | | 709/220 |
| 2016/0269451 | A1* | 9/2016 | Houchen | H04L 12/1827 |
| 2017/0006162 | A1* | 1/2017 | Bargetzi | H04W 4/06 |
| 2017/0116579 | A1 | 4/2017 | Emejulu et al. | |
| 2017/0118165 | A1* | 4/2017 | Kumar | G06F 16/9537 |
| 2018/0285171 | A1* | 10/2018 | Brady | G06Q 10/1095 |
| 2018/0314821 | A1* | 11/2018 | Brady | G06F 9/45558 |
| 2018/0357440 | A1* | 12/2018 | Brady | G06F 21/6218 |
| 2018/0375676 | A1* | 12/2018 | Bader-Natal | H04L 65/403 |
| 2019/0147089 | A1* | 5/2019 | Megahed | G06F 16/2477 |
| | | | | 707/718 |

OTHER PUBLICATIONS

Author Unknown, "Managing BlueJeans Rooms in Command Center," support.bluejeans.com/knowledge/rooms-command-center, accessed on Jan. 29, 2019, Blue Jeans Network, Inc, 4 pages.

* cited by examiner

CONCURRENT MEETING AND COMPUTE INSTANCE SCHEDULING

BACKGROUND

It is increasingly common for groups of people to meet from remote locations using conferencing and other collaboration technologies in order to reduce traveling and increase efficiency and productivity. Certain meetings require that a software package be implemented on a computing device prior to the meeting so that the software package can be utilized by one or more attendees during the meeting.

SUMMARY

The examples disclosed herein implement concurrent meeting and compute instance scheduling wherein, at the time of scheduling, a meeting a compute instance can be scheduled to be provisioned in a desired manner at a predetermined time prior to the meeting. In this manner, the compute instance is automatically provisioned and ready for use at the time of the meeting.

In one example a method is provided. The method includes receiving, by a computing device comprising a processor device, via a meeting invite interface presented on a display device, a request to schedule a compute instance to be provisioned for use during a meeting identified in the meeting invite interface. The method further includes causing the compute instance to be provisioned at a predetermined time prior to a meeting start time, and obtaining an address of the compute instance that identifies a location of the compute instance prior to the meeting start time.

In another example a computing device is provided. The computer device includes a memory and a processor device coupled to the memory. The processor device is to receive, via a meeting invite interface presented on a display device, a request to schedule a compute instance to be provisioned for use during a meeting identified in the meeting invite interface. The processor device is further to cause the compute instance to be provisioned at a predetermined time prior to a meeting start time, and obtain an address of the compute instance that identifies a location of the compute instance prior to the meeting start time.

In another example a computer program product is provided. The computer program product is stored on a non-transitory computer-readable storage medium and includes instructions configured to cause a processor device to receive, via a meeting invite interface presented on a display device, a request to schedule a compute instance to be provisioned for use during a meeting identified in the meeting invite interface. The instructions further cause the processor device to cause the compute instance to be provisioned at a predetermined time prior to a meeting start time, and obtain an address of the compute instance that identifies a location of the compute instance prior to the meeting start time.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

It is increasingly common for groups of people to meet from remote locations using conferencing and other collaboration technologies in order to reduce traveling and increase efficiency and productivity. Certain meetings require that a software package be implemented on a computing device prior to the meeting so that the software package can be utilized by one or more attendees during the meeting.

As one example, a software product salesperson may desire to demonstrate a software package to potential customers, and thus needs the software package to be installed and ready to be demonstrated by the time the meeting starts. As another example, an instructor may desire to demonstrate to a group of students how a certain software package operates. In another example, a computer technician may wish to work with a customer to resolve a problem and wants the software environment in which the problem occurs to be recreated on a test computing device for use during a meeting with the customer.

Unfortunately, provisioning a computing device with the appropriate software may not be a trivial, or fast, process, and therefore may be deferred until a later point in time. Such deferral may result in the computing device not being provisioned by the time of the meeting, or substantial scrambling to provision the computing device immediately prior to the meeting. Moreover, even if the meeting organizer does not wish to defer the provisioning process, the meeting may be scheduled for a date that is relatively far in the future, such as days, weeks or months, and computing devices are a finite resource such that it may not be feasible to reserve a computing device for the entire period of time between the time the meeting is scheduled and the meeting itself.

The examples disclosed herein implement concurrent meeting and compute instance scheduling wherein at the time of scheduling a meeting a compute instance can be scheduled to be provisioned in a desired manner at a predetermined time prior to the meeting so that the compute instance is automatically provisioned and ready for use at the time of the meeting. The term "compute instance" as used herein, refers to an addressable computing environment, such as a bare metal machine, a virtual machine, or a container (e.g., a Docker container).

In one example, a meeting invite interface is presented on a display device. A request to schedule a compute instance to be provisioned for use during a meeting identified in the meeting invite interface is then received. The compute instance is caused to be provisioned at a predetermined time prior to the meeting start time. An address of the compute instance that identifies a location of the compute instance prior to the meeting start time is obtained. In this manner, the disclosed examples efficiently reserve a compute instance for use during a meeting, and allow the compute instance to be used for other meetings prior to the meeting. Moreover, the disclosed examples eliminate a need for a meeting organizer to subsequently remember to provision a compute instance. Additionally, in some of the disclosed examples, a predetermined maximum number of compute instances may be scheduled for use at one time, and thus, at the time of the meeting, the meeting organizer can ensure either that a compute instance will be available for use during the meeting, or that the meeting must be scheduled for a different time when a compute instance can be available for use.

Figure 1A:
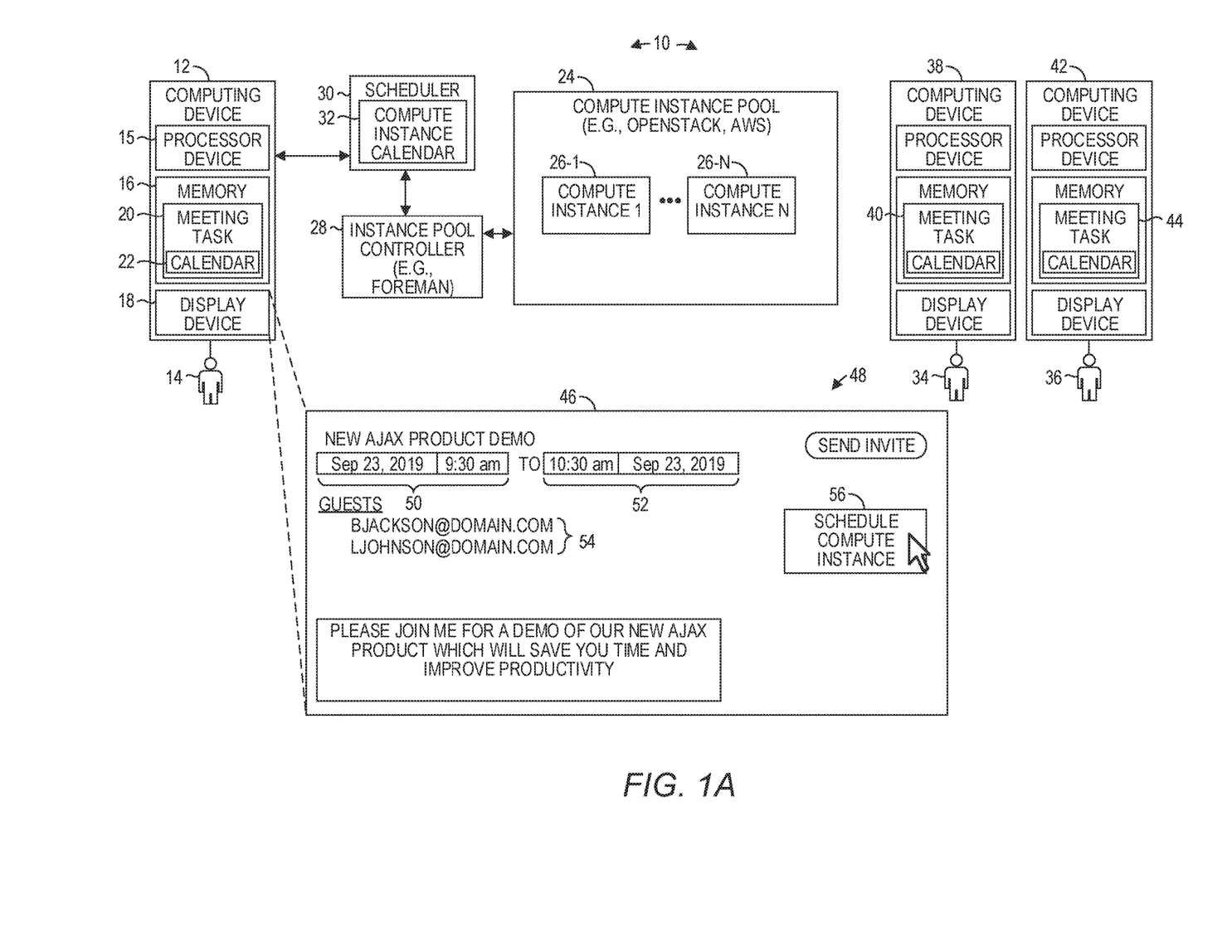
FIGS. 1A-1D are block diagrams that illustrate an environment at successive points in time suitable for implementing concurrent meeting and compute instance scheduling according to some examples.

FIG. 1A is a block diagram of an environment 10 in which examples may be practiced. The environment 10 includes a computing device 12 associated with a user 14. The computing device 12 includes a processor device 15 coupled to a memory 16 and to a display device 18. The memory 16 contains a meeting task 20 that is configured to generate meeting invite interfaces that allow the user 14 to schedule meetings with other individuals. The meeting task 20 maintains a calendar 22 to keep track of scheduled meetings of the user 14, including meetings initiated by other users. The meeting task 20 may comprise any email and/or calendaring task modified in accordance with the disclosure herein, such as Microsoft® Outlook™, Google Calendar™, or the like.

It will be noted that because the meeting task 20 is a component of the computing device 12, functionality implemented by the meeting task 20 may be attributed to the computing device 12 generally. Moreover, in examples where the meeting task 20 comprises software instructions that program the processor device 15 to carry out functionality discussed herein, functionality implemented by the meeting task 20 may be attributed herein to the processor device 15.

The environment 10 also includes a compute instance pool 24 that contains a plurality of resources suitable for implementing a plurality of compute instances 26-1-26-N (generally, compute instances 26). A compute instance 26 comprises an addressable computing environment, such as a bare metal machine, a virtual machine, or a container (e.g., a Docker container). The environment 10, in some examples, may comprise a cloud computing environment, such as an Amazon Amazon Web Services (AWS) cloud computing environment, a Microsoft® Azure™ cloud computing environment, or a private cloud computing environment. The environment 10 may also include an instance pool controller 28 for provisioning compute instances 26 in a desired manner. The terms "provision" and "provisioning" refer to installing desired software packages and configuration options on a compute instance 26 to provide a desired environment.

The instance pool controller 28 may comprise any suitable software task that can, upon request, provision a compute instance 26 in a desired manner. As an example, the instance pool controller 28 may comprise the Foreman lifecycle management tool available at www.theforeman.org, the Beaker management and automation software available at beaker-project.org, or any other software task capable of provisioning a compute instance upon request.

In some implementations, the environment 10 may include a scheduler 30 that may receive a request from the meeting task 20 to schedule the provisioning of a compute instance 26 at a predetermined time, and that interfaces with the instance pool controller 28 at the appropriate time to cause the provisioning of the compute instance 26. The scheduler 30 may maintain a compute instance calendar 32 to maintain a schedule of compute instances 26 that are to be provisioned at a future point in time. In some examples, the scheduler 30 may be configured to limit a maximum number of compute instances 26 that may be provisioned at the same time, and communicate with the meeting task 20 to advise the meeting task 20 whether or not a compute instance 26 can be scheduled to be provisioned at a particular time.

Assume for purposes of illustration that the user 14 is a salesperson who desires to demonstrate a new AJAX product to users 34 and 36, who are potential buyers. User 34 is associated with a computing device 38 that is configured substantially similarly to the computing device 12, and which includes a meeting task 40 that interacts with the meeting task 20 to facilitate meetings between the user 34 and the user 14. Similarly, the user 36 is associated with a computing device 42 that is configured substantially similarly to the computing device 12, and which includes a meeting task 44 that interacts with the meeting task 20 and the meeting task 40 to facilitate meetings between the users 34 and 14.

In response to a request from the user 14, the meeting task 20 presents a meeting invite window 46 on the display device 18. The meeting invite window 46 is part of a meeting invite interface 48 used to concurrently schedule a meeting and schedule a compute instance 26 to be provisioned in advance of the meeting. The term "meeting invite interfaces 48" as used herein means the collection of UI windows, dialog boxes, and other controls that may be presented by the meeting task 20 on the display device 18 to implement the functionality disclosed herein. While the examples illustrate one potential meeting invite interface 48, it will be appreciated that the examples disclosed herein could be implemented via any number of different meeting invite interfaces 48.

To schedule the meeting, the user 14 designates a proposed meeting start time and date in a start time and date control 50 and a proposed meeting end time in an end time and date control 52. The user 14 designates the users 34 and 36 in a guest field 54. In some examples, after the user 14 has completed the start time and date control 50 and the end time and date control 52, the meeting task 20 may communicate with the scheduler 30 to ensure that a compute instance 26 can be provisioned for the time identified in the start time and date control 50. In particular, as discussed above, in some implementations the scheduler 30 may impose a maximum on the number of compute instances 26 that can be used for meetings at the same time. The scheduler 30 may then access the compute instance calendar 32 to determine the quantity of other compute instances 26 already scheduled to be in a provisioned state at the time identified in the start time and date control 50 and determine that provisioning an additional compute instance 26 will not exceed the predetermined maximum quantity of compute instances 26 permitted to be in the provisioned state at the same time. If the predetermined maximum quantity of compute instances 26 will be exceeded, the scheduler 30 indicates this to the meeting task 20, and in response, the meeting task 20 may indicate in the meeting invite window 46 that no compute instance 26 can be scheduled to be provisioned at that time. The user 14 may then select another time and date. If the predetermined maximum quantity of compute instances 26 will not be exceeded, the meeting task 20 allows the user 14 to select a schedule compute instance control 56. In this example, assume that there is no predetermined maximum quantity of compute instances 26 that can be scheduled at one time, and that the user 14 selects the schedule compute instance control 56 to reserve and provision a compute instance 26 for use during the meeting.

Figure 1B:
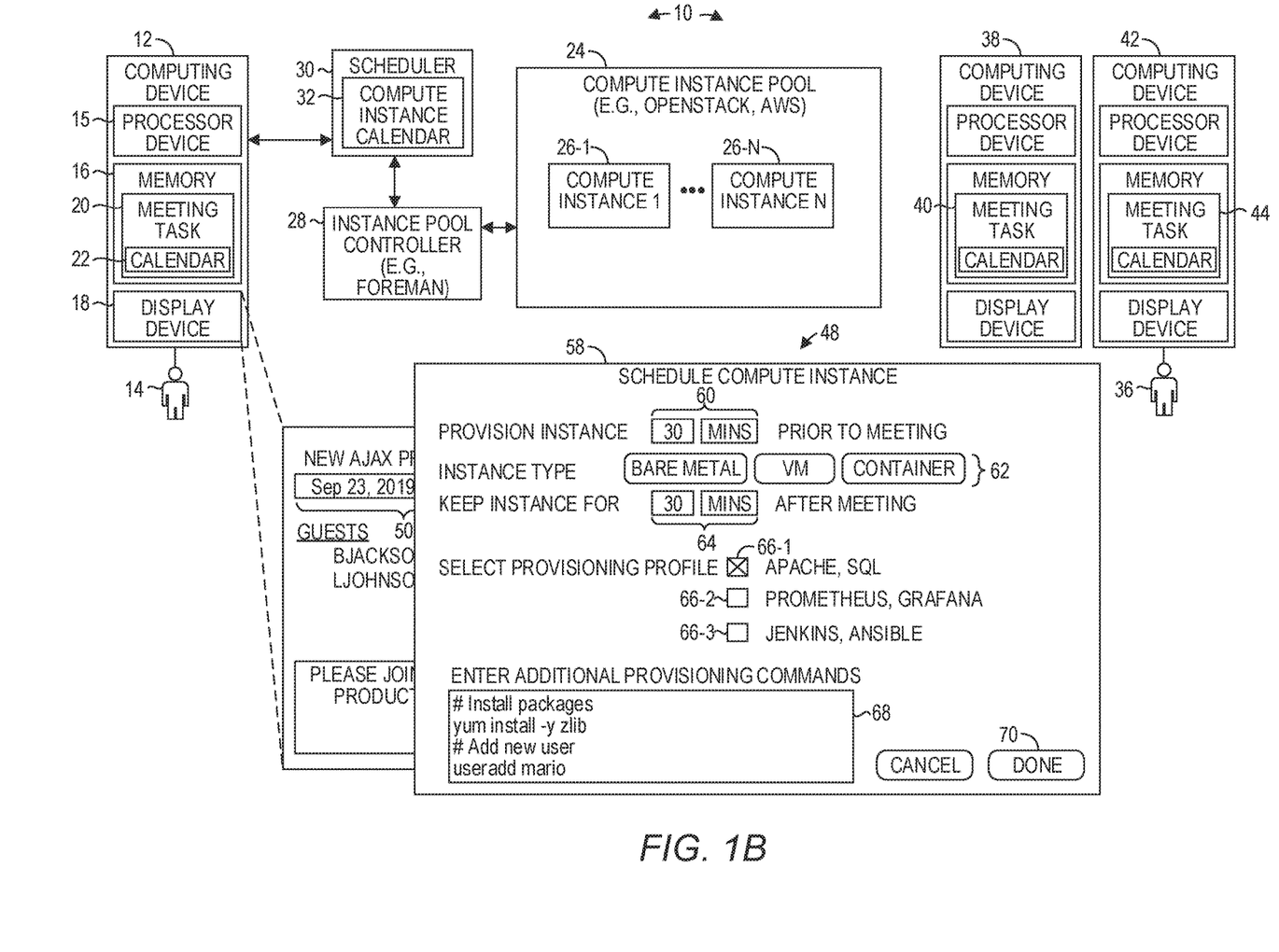

Referring now to FIG. 1B, the meeting task 20, in response to the selection of the schedule compute instance control 56, presents on the display device 18 a schedule compute instance window 58 that is part of the meeting invite interface 48. The schedule compute instance window 58 includes a provision time identifier 60 that identifies a predetermined time prior to the meeting start time identified in the start time and date control 50 (FIG. 1A) when the compute instance 26 is to be provisioned. The provision time identifier 60 may identify an actual time, or may identify a time that is relative to the time in the start time and date control 50. In this example, the user 14 has indicated that the compute instance 26 should be provisioned at least 30 minutes prior to the start of the meeting.

The schedule compute instance window 58 also includes an instance type control 62 that allows the user 14 to select a type of compute instance 26 that is to be provisioned, such as, by way of non-limiting example, a bare metal host, a virtual machine (VM) or a container (e.g., a Docker container). The schedule compute instance window 58 includes a deletion time identifier 64 that identifies the predetermined time after the meeting end time identified in the end time and date control 52 (FIG. 1A) when the compute instance 26 is to be deleted. The deletion time identifier 64 may identify an actual time, or may identify a time that is relative to the time in the end time and date control 52. In this example, the user 14 has indicated that the compute instance 26 should be deleted 30 minutes after the time identified in the end time and date control 52. The precise action taken to delete the compute instance 26 may differ depending on the compute instance type. For example, if the compute instance 26 is a container, any data stored on any hard drive to provision the container may be deleted and the container may be caused to terminate. If the compute instance 26 is a VM, any data stored on any hard drive to provision the VM may be deleted and the VM may be caused to terminate. If the compute instance 26 is a bare metal machine, any data stored on any hard drive to provision the bare metal machine may be deleted and the bare metal machine may be restarted to refresh the memory.

The schedule compute instance window 58 may include one or more profile controls 66-1-66-3, each of which corresponds to a different provisioning profile. Each provisioning profile identifies one or more packages that are to be installed on the compute instance 26. Selection of one or more of the profile controls 66-1-66-3 causes a corresponding one or more provisioning profile identifiers to be communicated to the meeting task 20. The meeting task 20 then causes the one or more packages that correspond to the selected provisioning profile(s) to be automatically installed on the compute instance 26 at the time the compute instance 26 is provisioned. The schedule compute instance window 58 may also include a provisioning command control 68 that allows the user 14 to enter, via user input, additional provisioning commands that will be implemented on the compute instance 26 at the time the compute instance 26 is provisioned.

After the user 14 has finished entering the desired user input into the schedule compute instance window 58, the user 14 may select a done control 70 to indicate to the meeting task 20 that the user 14 is finished.

Figure 1C:
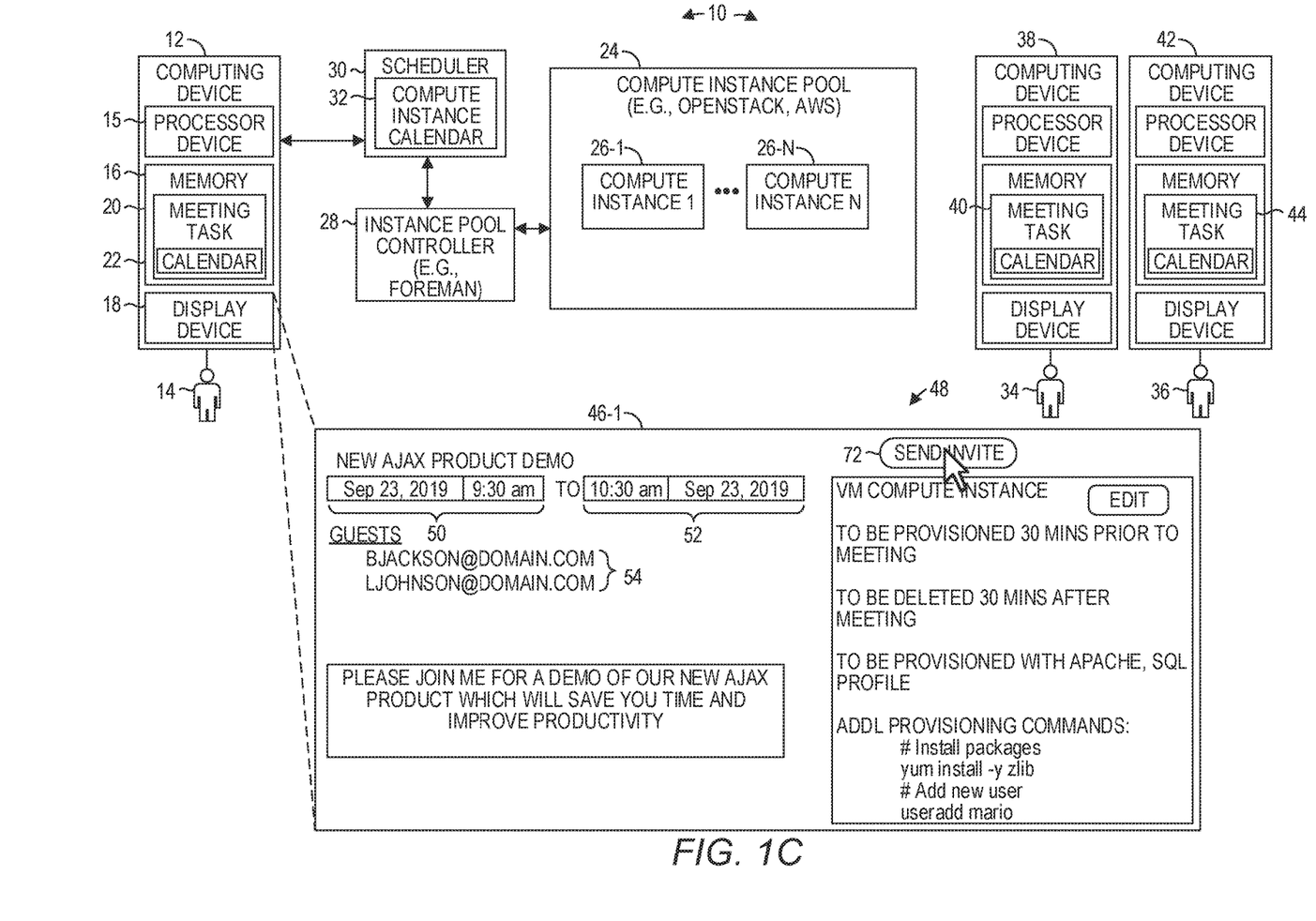

Referring now to FIG. 1C, the meeting task 20 may present a meeting invite window 46-1 that is part of the meeting invite interface 48 and that consolidates the information obtained from the schedule compute instance window 58 and the meeting invite window 46 to allow the user 14 to either edit information or initiate a meeting request by selecting a send control 72. For purposes of illustration, assume that the user 14 is satisfied with the information presented in the meeting invite window 46-1 and selects the send control 72.

The meeting task 20 then causes a compute instance 26 to be provisioned at the predetermined time prior to the meeting start time identified in the start time and date control 50 as identified by the provision time identifier 60. In particular, the meeting task 20 sends a request to the scheduler 30 to provision a compute instance 26 at the predetermined time prior to the meeting start time. The request may include the predetermined time prior to the meeting start time that the compute instance 26 is to be provisioned, the type of compute instance 26 to provision (e.g., bare metal, VM or container), the identification of one or more provisioning profiles that correspond to one or more selected profile controls 66-1-66-3, additional provisioning commands identified by the user 14 in the provisioning command control 68, and the predetermined time after the meeting end time that the compute instance 26 is to be deleted. The scheduler 30 receives the request and stores the relevant information in the compute instance calendar 32.

Figure 1D:
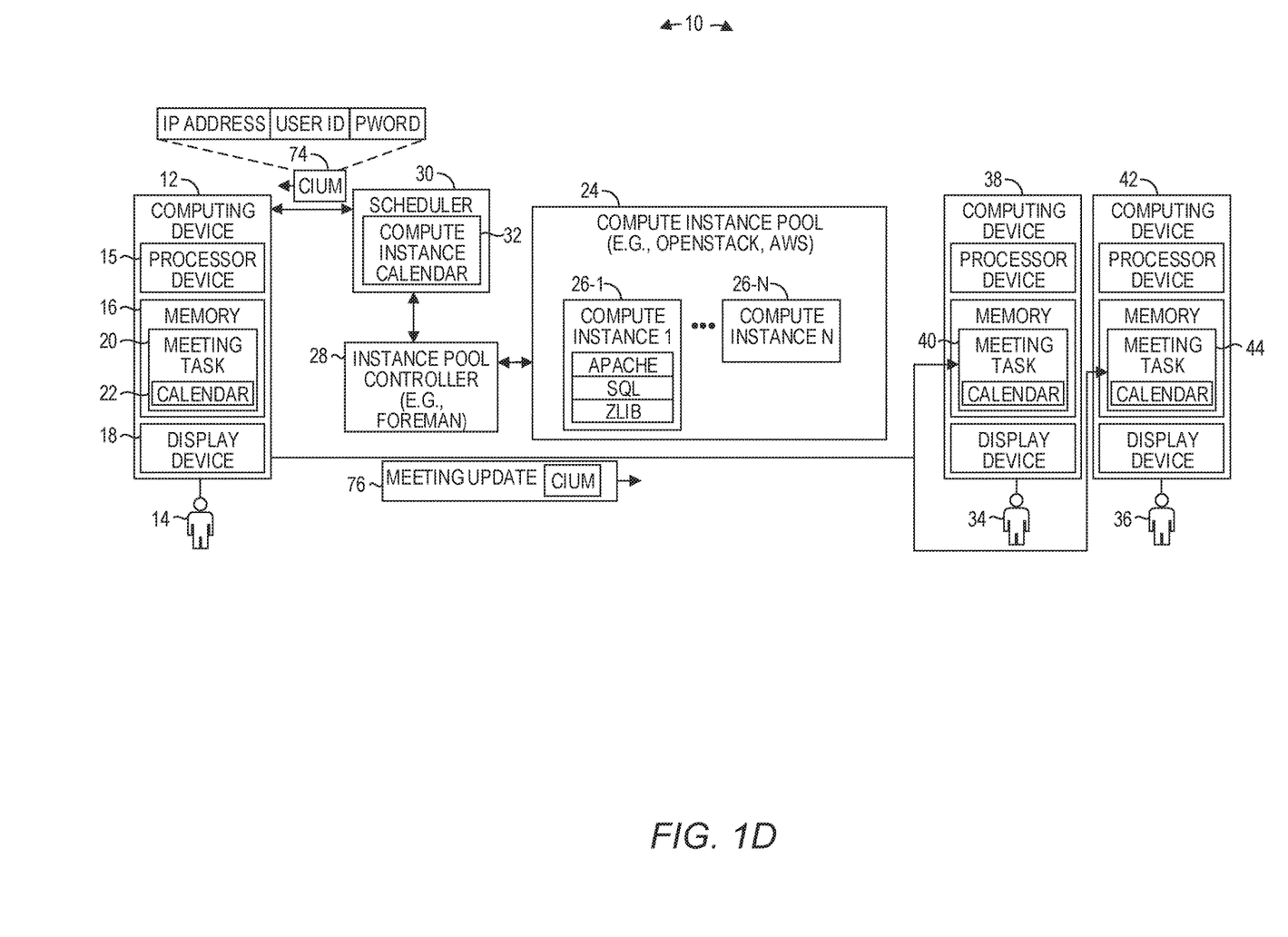

Referring now to FIG. 1D, the scheduler 30 determines that the predetermined time prior to the meeting start time has arrived. The scheduler 30 communicates with the instance pool controller 28 to cause the compute instance 26-1 to be provisioned in accordance with the information provided to the scheduler 30 by the meeting task 20. In particular, the scheduler 30 communicates with the instance pool controller 28 to cause the instance pool controller 28 to initiate the compute instance 26-1 of an appropriate type (e.g., bare metal, VM or container), to provision the compute instance 26-1 with the software packages identified in the one or more provisioning profiles that correspond to one or more selected profile controls 66-1-66-3, and to implement the additional provisioning commands identified by the user 14 in the provisioning command control 68.

The instance pool controller 28 provisions the compute instance 26-1 as directed by the scheduler 30, and provides the scheduler 30 an internet protocol (IP) address of the compute instance 26-1, and authentication credentials, such as a user identifier and password, that will allow the user 14 to access the compute instance 26-1 during the meeting. The scheduler 30, prior to the meeting, sends a compute instance update message 74 to the meeting task 20 that contains the IP address of the compute instance 26-1 and the authentication credentials. The meeting task 20 may automatically update the calendar 22 of the user 14 with the relevant information. The meeting task 20 may also automatically generate, based on the compute instance update message 74, a meeting update message 76 with the information identified in the compute instance update message 74, and send the meeting update message 76 to the meeting tasks 40, 44 so that the users 34 and 36 can be authenticated and access and utilize the compute instance 26-1 along with the user 14. At the predetermined time after the meeting end time, the scheduler 30 communicates with the instance pool controller 28 to cause the instance pool controller 28 to delete the compute instance 26-1.

Figure 2:
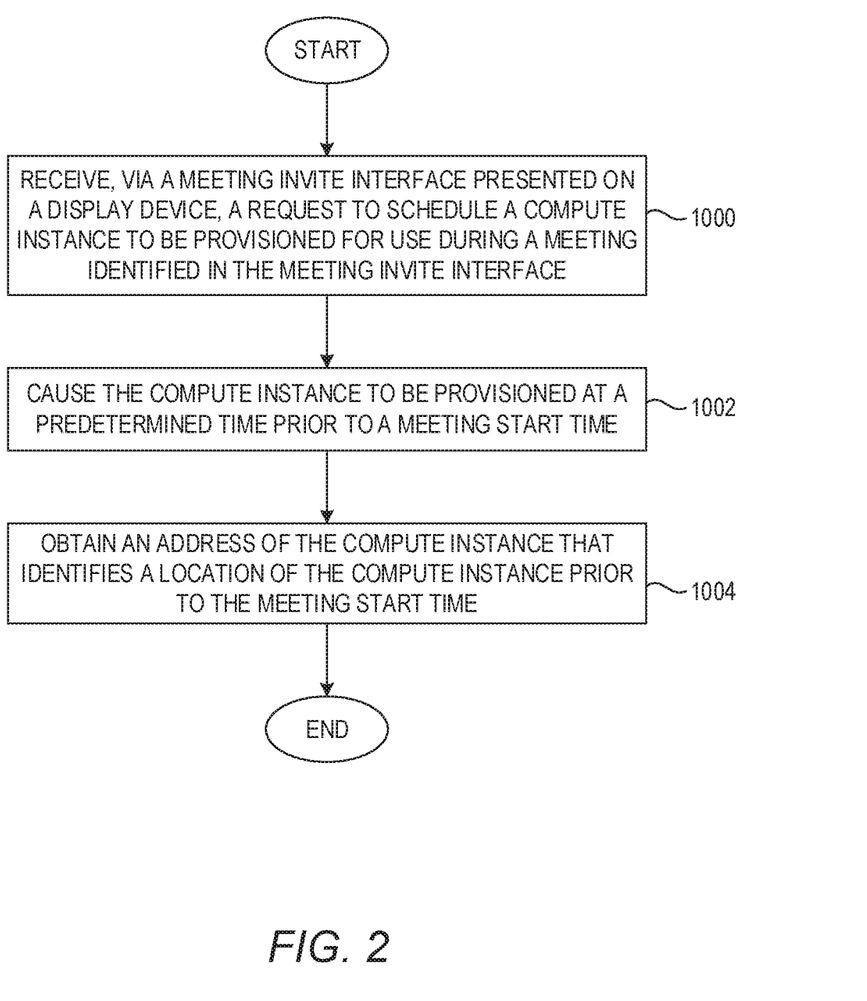
FIG. 2 is a flowchart of a method for concurrent meeting and compute instance scheduling according to one example.

FIG. 2 is a flowchart of a method for concurrent meeting and compute instance scheduling according to one example. FIG. 2 will be discussed in conjunction with FIGS. 1A-1D. The computing device 12 receives, via the meeting invite interface 48 presented on the display device 18, a request to schedule a compute instance 26 to be provisioned for use during a meeting identified in the meeting invite interface 48 (FIG. 2, block 1000). The computing device 12 causes the compute instance 26-1 to be provisioned at the predetermined time prior to the meeting start time (FIG. 2, block 1002). The computing device 12 obtains the address of the compute instance 26-1 that identifies a location of the compute instance 26 prior to the meeting start time (FIG. 2, block 1004).

Figure 3:
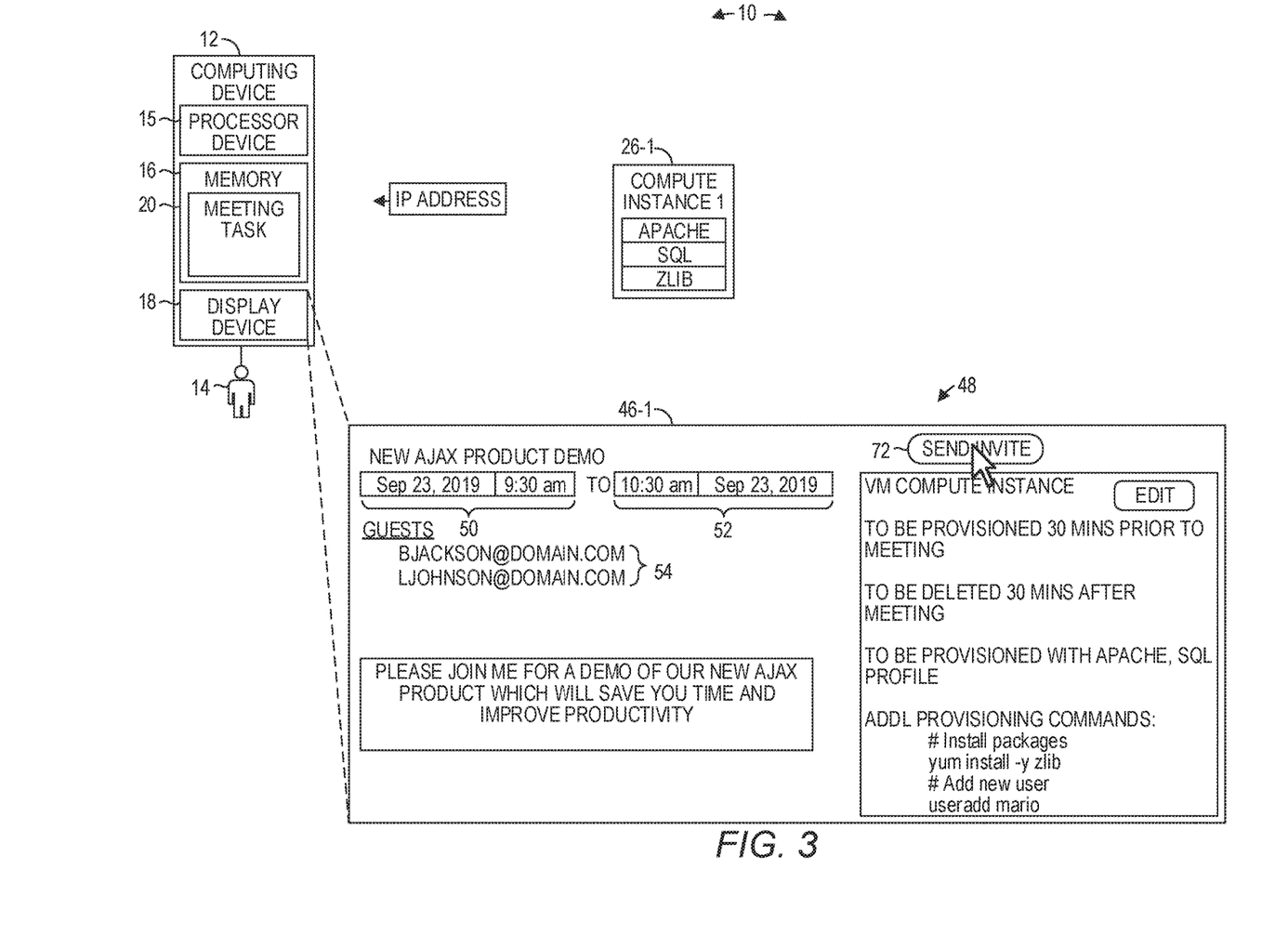
FIG. 3 is a simplified block diagram of the environment illustrated in FIG. 1.

FIG. 3 is a simplified block diagram of the environment 10 illustrated in FIGS. 1A-1D. The computing device 12 includes the memory 16 and the processor device 15 coupled to the memory 16. The processor device 15 is to receive, via the meeting invite interface 48 presented on the display device 18, a request to schedule the compute instance 26-1 to be provisioned for use during a meeting identified in the meeting invite interface 48. The processor device 15 is further to cause the compute instance 26-1 to be provisioned at the predetermined time prior to the meeting start time. The processor device 15 is further to obtain an address of the compute instance 26-1 that identifies a location of the compute instance 26-1 prior to the meeting start time.

Figure 4:
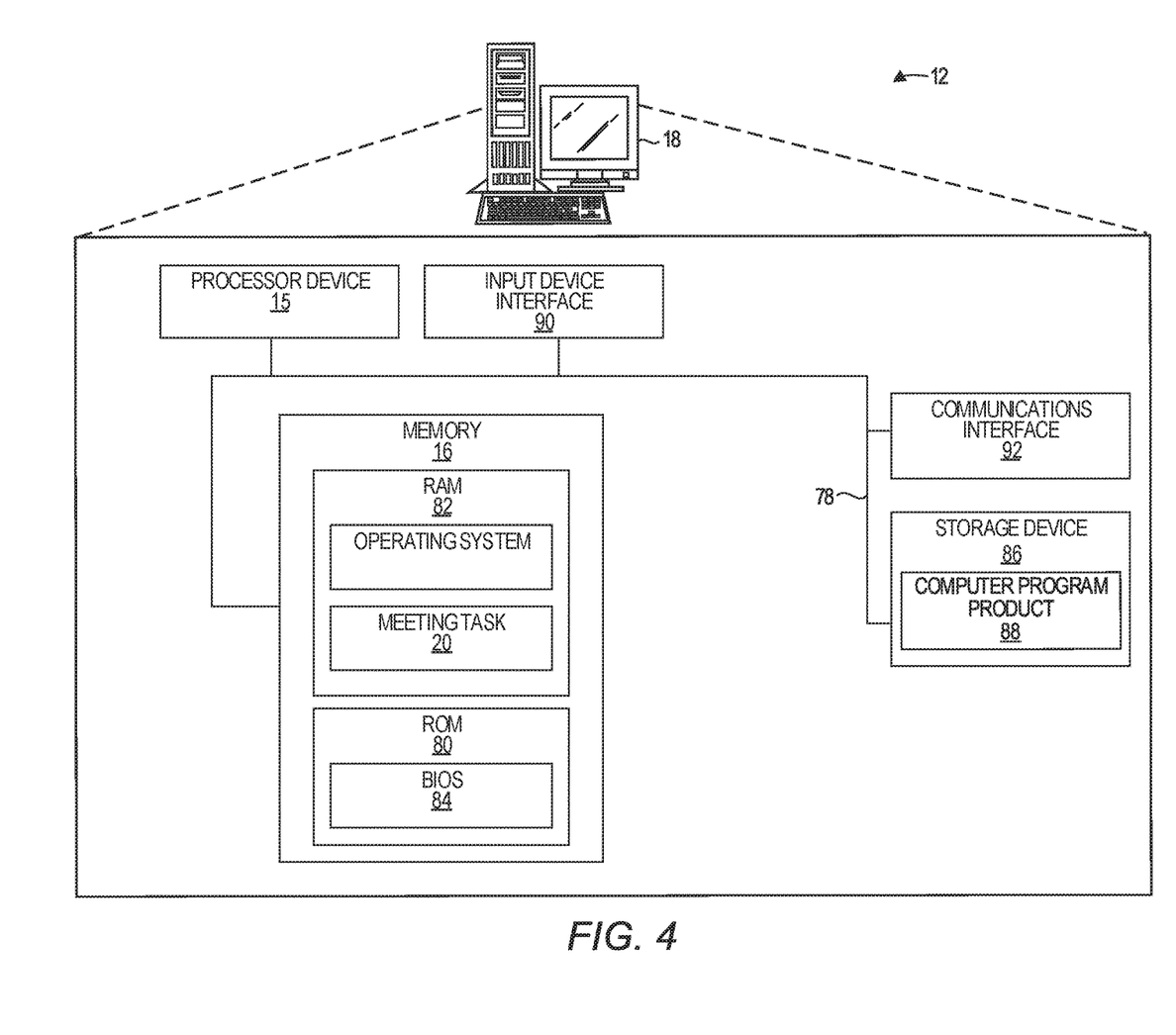
FIG. 4 is a block diagram of a computing device suitable for implementing examples according to one example.

FIG. 4 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 15, the memory 16, and a system bus 78. The system bus 78 provides an interface for system components including, but not limited to, the memory 16 and the processor device 15. The processor device 15 can be any commercially available or proprietary processor.

The system bus 78 may be any of several types of bus structures that may further interconnect to a memory bus (with or without a memory controller), a peripheral bus, and/or a local bus using any of a variety of commercially available bus architectures. The memory 16 may include non-volatile memory 80 (e.g., read-only memory (ROM), erasable programmable read-only memory (EPROM), electrically erasable programmable read-only memory (EEPROM), etc.), and volatile memory 82 (e.g., random-access memory (RAM)). A basic input/output system (BIOS) 84 may be stored in the non-volatile memory 80 and can include the basic routines that help to transfer information between elements within the computing device 12. The volatile memory 82 may also include a high-speed RAM, such as static RAM, for caching data.

The computing device 12 may further include or be coupled to a non-transitory computer-readable storage medium such as a storage device 86, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 86 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 86 and in the volatile memory 82, including an operating system and one or more program modules, such as the meeting task 20, which may implement the functionality described herein in whole or in part. All or a portion of the examples may be implemented as a computer program product 88 stored on a transitory or non-transitory computer-usable or computer-readable storage medium, such as the storage device 86, which includes complex programming instructions, such as complex computer-readable program code, to cause the processor device 15 to carry out the steps described herein. Thus, the computer-readable program code can comprise software instructions for implementing the functionality of the examples described herein when executed on the processor device 15. The processor device 15, in conjunction with the meeting task 20 in the volatile memory 82, may serve as a controller, or control system, for the computing device 12 that is to implement the functionality described herein.

The user 14, may also be able to enter one or more configuration commands through a keyboard (not illustrated), a pointing device such as a mouse (not illustrated), or a touch-sensitive surface such as the display device 18. Such input devices may be connected to the processor device 15 through an input device interface 90 that is coupled to the system bus 78 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 92 suitable for communicating with a network as appropriate or desired.

While the examples have been disclosed as utilizing certain functional processes, such as the meeting task 20, the scheduler 30 and the instance pool controller 28, it will be appreciated that the novel functionality disclosed herein could be implemented in different ways. For example, in another example, the scheduler 30 and the instance pool controller 28 could be integrated into a single module.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a computing device comprising a processor device, via a meeting invite interface presented on a display device, a request to schedule a compute instance to be provisioned for use during a meeting identified in the meeting invite interface;
reserving, by the computing device comprising the processor device, the compute instance for use during the meeting among a predetermined maximum quantity of compute instances permitted to be in a provisioned state at a same time;
causing, by the computing device comprising the processor device, the compute instance to be provisioned at a predetermined time prior to a meeting start time;
obtaining, by the computing device comprising the processor device, an address of the compute instance that identifies a location of the compute instance prior to the meeting start time; and
deleting, by the computing device comprising the processor device, the compute instance at a predetermined time after a meeting end time.

2. The method of claim 1 further comprising receiving, by the computing device comprising the processor device, via the meeting invite interface, a deletion time identifier that identifies the predetermined time after the meeting end time that the compute instance is to be deleted.

3. The method of claim 1 further comprising receiving, by the computing device comprising the processor device, via the meeting invite interface, a provision time identifier that identifies the predetermined time prior to the meeting start time that the compute instance is to be provisioned.

4. The method of claim 1 further comprising:
receiving, by the computing device comprising the processor device, via the meeting invite interface, one or more provisioning commands entered via user input into the meeting invite interface; and
causing, by the computing device comprising the processor device, the one or more provisioning commands to be implemented on the compute instance at a time the compute instance is provisioned.

5. The method of claim 1 further comprising:
providing, by the computing device comprising the processor device, via the meeting invite interface, a provisioning command control to receive one or more provisioning commands entered via user input;
receiving, by the computing device comprising the processor device, via the meeting invite interface, one or more provisioning commands entered via user input; and
causing, by the computing device comprising the processor device, the one or more provisioning commands to be implemented on the compute instance at a time the compute instance is provisioned.

6. The method of claim 1 further comprising:
receiving, by the computing device comprising the processor device, via the meeting invite interface, a provisioning profile identifier that identifies a selected provisioning profile of a plurality of different provisioning profiles, the selected provisioning profile identifying one or more packages to be installed on the compute instance; and
causing, by the computing device comprising the processor device, the one or more packages identified in the selected provisioning profile to be installed at a time the compute instance is provisioned.

7. The method of claim 1 further comprising sending, by the computing device comprising the processor device, to an attendee of the meeting, authentication credentials that authenticate the attendee to utilize the compute instance.

8. The method of claim 7 further comprising sending, by the computing device comprising the processor device, to each attendee of a plurality of attendees of the meeting, authentication credentials that authenticate each attendee to utilize the compute instance.

9. The method of claim 1 further comprising:
determining, by the computing device comprising the processor device, a quantity of other compute instances previously scheduled to be in a provisioned state at the meeting start time; and
determining, by the computing device comprising the processor device, based on the quantity of other compute instances previously scheduled to be in the provisioned state at the meeting start time and the predetermined maximum quantity of compute instances permitted to be in the provisioned state at the same time that the compute instance can be provisioned.

10. The method of claim 1 further comprising:
prior to receiving the request, presenting, by the computing device comprising the processor device, on the display device, the meeting invite interface, the meeting invite interface including at least one time and date control via which a user can identify a time and date of the meeting and at least one compute instance control via which the user can request to schedule the compute instance to be provisioned for use during the meeting identified in the at least one time and date control.

11. The method of claim 1 wherein causing the compute instance to be provisioned at the predetermined time prior to the meeting start time comprises sending, by the computing device comprising the processor device, to a scheduler task, a request to provision the compute instance at the predetermined time prior to the meeting start time.

12. A computing device, comprising:
a memory comprising computer-executable instructions; and
a processor device coupled to the memory to execute the computer-executable instructions that cause the processor device to:
receive, via a meeting invite interface presented on a display device, a request to schedule a compute instance to be provisioned for use during a meeting identified in the meeting invite interface, the compute instance comprising an addressable computing environment;
reserve the compute instance for use during the meeting among a predetermined maximum quantity of compute instances permitted to be in a provisioned state at a same time;
cause the compute instance to be provisioned with one or more packages at a predetermined time prior to a meeting start time;
obtain an address of the compute instance that identifies a location of the compute instance prior to the meeting start time; and
delete the compute instance at a predetermined time after a meeting end time.

13. The computing device of claim 12 wherein the processor device is further to receive, via the meeting invite interface, a provision time identifier that identifies the predetermined time prior to the meeting start time that the compute instance is to be provisioned.

14. The computing device of claim 12 wherein the processor device is further to:
- receive, via the meeting invite interface, a provisioning profile identifier that identifies a selected provisioning profile of a plurality of different provisioning profiles, the selected provisioning profile identifying the one or more packages to be installed on the compute instance; and
- cause the one or more packages identified in the selected provisioning profile to be installed at a time the compute instance is provisioned.

15. The computing device of claim 12 wherein the processor device is further to send, to an attendee of the meeting, authentication credentials that authenticate the attendee to utilize the compute instance.

16. A computer program product stored on a non-transitory computer-readable storage medium and including instructions to cause a processor device to:
- receive, via a meeting invite interface presented on a display device, a request to schedule a compute instance to be provisioned for use during a meeting identified in the meeting invite interface, the compute instance comprising an addressable computing environment;
- reserve the compute instance for use during the meeting among a predetermined maximum quantity of compute instances permitted to be in a provisioned state at a same time;
- cause the compute instance to be automatically provisioned at a predetermined time prior to a meeting start time by automatically installing one or more software packages and one or more configuration options to provide a desired computing environment;
- obtain an address of the compute instance that identifies a location of the compute instance prior to the meeting start time; and
- delete the compute instance at a predetermined time after a meeting end time.

17. The computer program product of claim 16 wherein the instructions further cause the processor device to receive, via the meeting invite interface, a provision time identifier that identifies the predetermined time prior to the meeting start time that the compute instance is to be provisioned.

18. The computer program product of claim 16 wherein the instructions further cause the processor device to:
- receive, via the meeting invite interface, a provisioning profile identifier that identifies a selected provisioning profile of a plurality of different provisioning profiles, the selected provisioning profile identifying the one or more software packages to be installed on the compute instance; and
- cause the one or more software packages identified in the selected provisioning profile to be installed at a time the compute instance is provisioned.

19. The computer program product of claim 16 wherein the instructions further cause the processor device to send, to an attendee of the meeting, authentication credentials that authenticate the attendee to utilize the compute instance.

\* \* \* \* \*